United States Patent
Liu et al.

(10) Patent No.: US 12,415,226 B2
(45) Date of Patent: Sep. 16, 2025

(54) METHODS AND APPARATUS FOR PULSE ARC STARTING PHASE FOR WELDING

(71) Applicant: Illinois Tool Works Inc., Glenview, IL (US)

(72) Inventors: Shuang Liu, Appleton, WI (US); Peter Mehn, Oshkosh, WI (US); Robert R. Davidson, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 539 days.

(21) Appl. No.: 17/002,925

(22) Filed: Aug. 26, 2020

(65) Prior Publication Data

US 2021/0060679 A1 Mar. 4, 2021

Related U.S. Application Data

(60) Provisional application No. 62/894,177, filed on Aug. 30, 2019.

(51) Int. Cl.
*B23K 9/09* (2006.01)
*B23K 9/073* (2006.01)
(Continued)

(52) U.S. Cl.
CPC .............. *B23K 9/091* (2013.01); *B23K 9/073* (2013.01); *B23K 9/0953* (2013.01); *B23K 9/0956* (2013.01); *B23K 9/173* (2013.01)

(58) Field of Classification Search
CPC ........ B23K 9/10; B23K 9/1031; B23K 9/067; B23K 9/073; B23K 9/091; B23K 9/092;
(Continued)

(56) References Cited

U.S. PATENT DOCUMENTS

2012/0325791 A1* 12/2012 Ash ................... B23K 9/067
219/130.21
2015/0352653 A1* 12/2015 Albrecht .............. B23K 9/0026
219/124.22

(Continued)

FOREIGN PATENT DOCUMENTS

| EP | 1004388 A1 | | 5/2000 |
|---|---|---|---|
| JP | 2016128187 | * | 7/2016 |
| KR | 20160084292 A | | 7/2016 |

OTHER PUBLICATIONS

English translation to JP 2016128187 (Year: 2016).*

(Continued)

*Primary Examiner* — Sang Y Paik
*Assistant Examiner* — Bonita Khlok
(74) *Attorney, Agent, or Firm* — MCANDREWS HELD & MALLOY LTD.

(57) ABSTRACT

Provided is a system for providing pulsed arc starting phase, where the system comprises power conversion circuitry configured to convert input power to welding-type power and output the welding-type power, and control circuitry configured to control the power conversion circuitry to output the welding-type power. The control circuitry is configured to control the power conversion circuitry to output a plurality of welding current pulses during at least a portion of one or both of a run-in period or a ramp period for wire feeding of a welding wire ends, where each of the plurality of welding current pulses is associated with a respective pulse period and a respective pulse duty cycle.

20 Claims, 4 Drawing Sheets

(51) Int. Cl.
*B23K 9/095* (2006.01)
*B23K 9/173* (2006.01)

(58) Field of Classification Search
CPC .... B23K 9/0953; B23K 9/0956; B23K 9/095; B23K 9/1087; B23K 9/1006; B23K 9/125; B23K 9/124; B23K 9/133; B23K 9/1336; B23K 9/1333; B23K 9/173; B23K 9/09–093; B23K 9/06–0671
USPC ...... 219/121.11, 121.13, 130.5–130.51, 132, 219/137 PS, 137.2
See application file for complete search history.

(56) References Cited

U.S. PATENT DOCUMENTS

2019/0358724 A1* 11/2019 Ono ................... B23K 9/125
2021/0299773 A1* 9/2021 Matsuoka ............ B23K 9/02

OTHER PUBLICATIONS

International Search Report, with a mailing date of Nov. 26, 2020, and Written Opinion in International application No. PCT/US2020/048092, filed on Aug. 27, 2020 (32 pages).
Canadian Patent Office, "Office Action", issued in connection with Canadian Patent Application No. 3,152,047, dated Oct. 13, 2023, 3 pages.
Canadian Patent Office, "Office Action", issued in connection with Canadian Patent Application No. 3,152,047, dated Aug. 26, 2024, 5 pages.

* cited by examiner

METHODS AND APPARATUS FOR PULSE ARC STARTING PHASE FOR WELDING

RELATED APPLICATIONS

This patent claims priority to U.S. Provisional Patent Application Ser. No. 62/894,177, filed Aug. 30, 2019, entitled "Method and Apparatus for Pulse Arc Starting Phase for Welding." The entirety of U.S. Provisional Patent Application Ser. No. 62/894,177 is incorporated herein by reference.

BACKGROUND

The present disclosure relates to providing an arc for welding, and more particularly, to a methods and apparatus for pulse arc starting phase for welding.

When welding is first started, providing welding arc with a welding wire, such as, for example, a metal core wire, using a constant voltage power source may cause problems where the welding wire can break and/or cause sputtering of melted metal over the workpiece. A broken welding wire will result in additional time to start a welding arc, and spattered metal may need to be removed adding additional work to finishing a welding job.

Limitations and disadvantages of conventional systems for heating a workpiece for welding will become apparent to one of skill in the art, through comparison of such approaches with some aspects of the present method and system set forth in the remainder of this disclosure with reference to the drawings.

SUMMARY

Methods and systems are provided for pulse arc starting phase for welding, substantially as illustrated by and described in connection with at least one of the figures, as set forth more completely in the claims.

BRIEF DESCRIPTION OF THE DRAWINGS

These and/or other aspects will become apparent and more readily appreciated from the following description of some various aspects of examples of the disclosure, taken in conjunction with the accompanying drawings.

The figures are not necessarily to scale. Where appropriate, similar or identical reference numbers are used to refer to similar or identical components.

DETAILED DESCRIPTION

Various examples of the disclosure improve a starting phase for welding to alleviate broken welding wires and/or sputtering of molten metal onto a workpiece. For example, when welding is first initiated, controlled pulses of welding current may be provided to a welding wire to alleviate overheating that can result in breaking the welding wire and/or also creating excess spatter. Conventional systems may break the welding wire at the location at which current is transferred to the welding wire (e.g., the contact point between the welding wire and a contact tip).

Keeping the welding wire from breaking at undesired places can help speed up the welding process because the welding wire does not need to be fed to the workpiece to make up for the broken welding wire. Additionally, reducing spatter caused by excess energy in the welding wire reduces grinding and/or other non-welding work to clean up the spatter.

Figure 1:
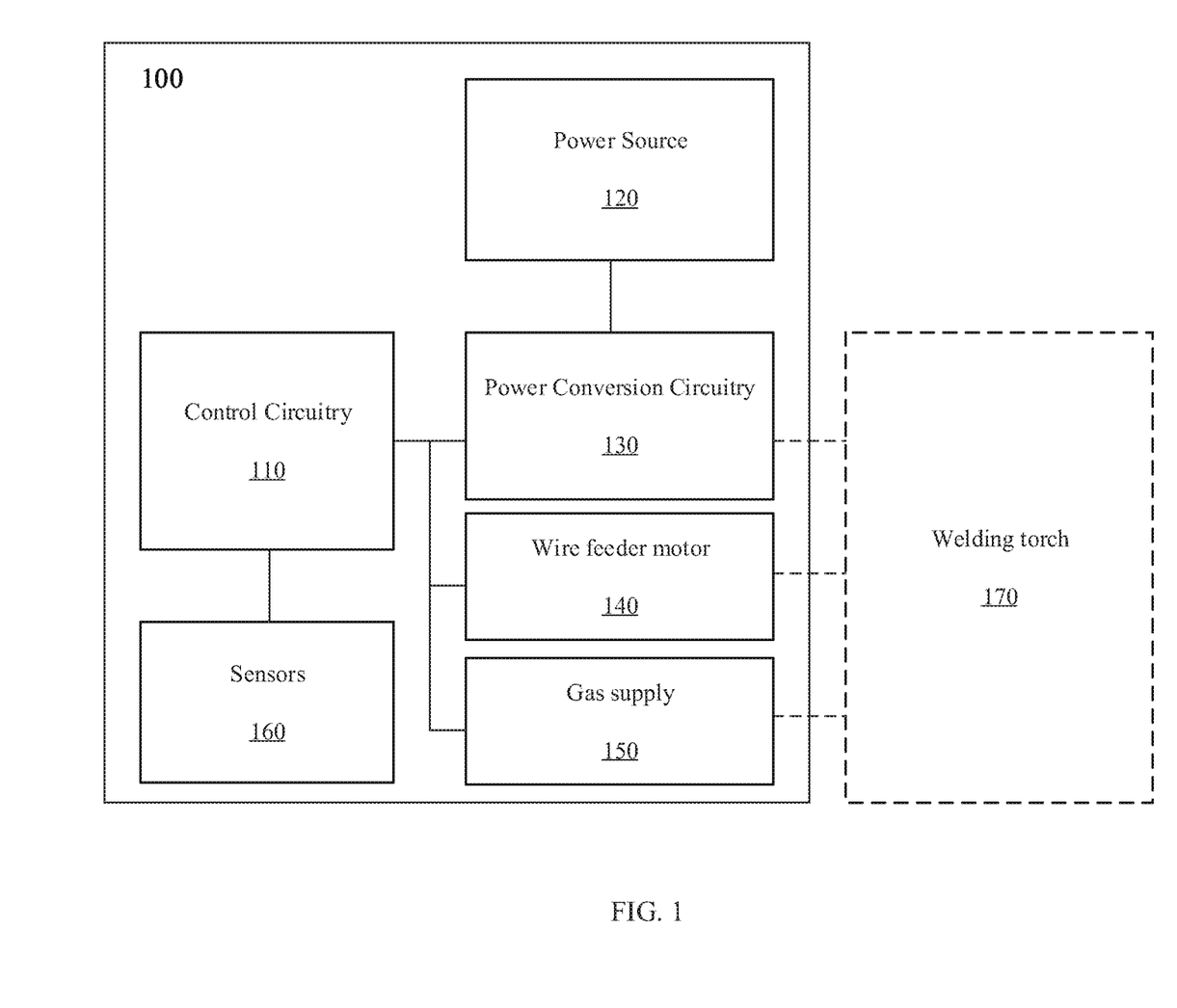
FIG. 1 is a high-level block diagram of system for providing welding current to a welding torch, in accordance with aspects of the disclosure.

FIG. 1 is a high-level block diagram of system for providing welding current to a welding torch, in accordance with aspects of the disclosure. Referring to FIG. 1, there is shown an example system 100 comprising control circuitry 110, a power source 120, power conversion circuitry 130, a wire feed motor 140, and a gas supply 150. The control circuitry 110 may also comprise sensors 160. There is also shown a welding torch 170 that receives welding-type power from the system 100, as well as the welding wire fed by the wire feed motor 140 and gas from the gas supply 150. The control circuitry 110 is shown in more detail in FIG. 2.

The control circuitry 110 is configured to output control signals to the power conversion circuitry 130 so that input power to the power conversion circuitry 130 can be converted to welding-type power, and the welding-type power can be output for use by the welding torch 170. The power conversion circuitry 130 converts the input power to output power pulses where at least one of the power pulses is controlled for pulse period and pulse duty cycle. The control circuitry 110 may control, for example, one or both of the current and voltage. For brevity, in the following examples the current will be described as being controlled as current pulses.

Figure 4:
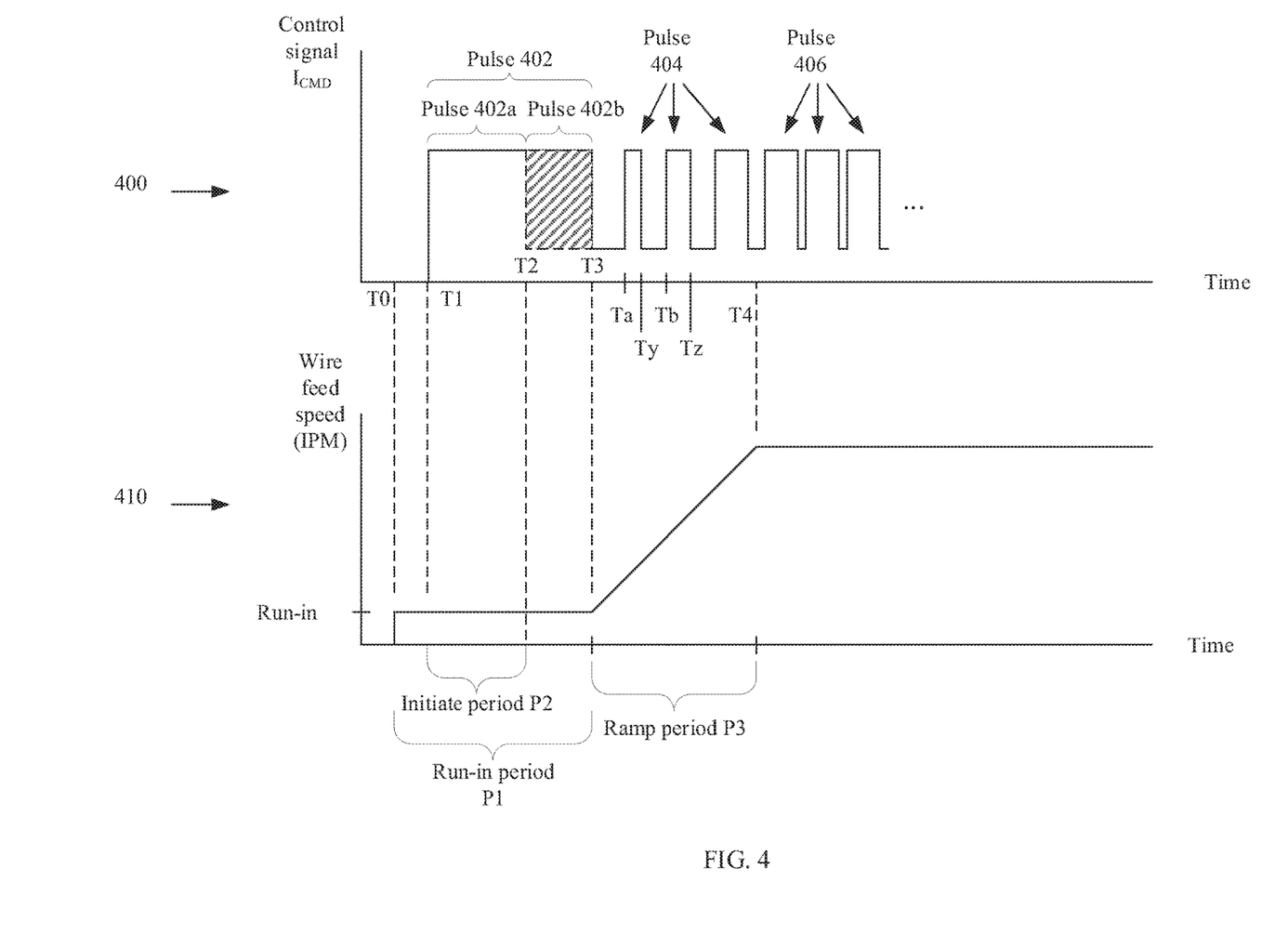
FIG. 4 shows graphs that illustrate example pulse control signals output by the control circuitry 110 and/or 200 of FIGS. 1 and 2 and example wire feed speed for the system 100 in FIG. 1.

The current pulses may be output by the power conversion circuitry 130 during and after a run-in period or only after the run-in period. As used herein, run-in period is defined as the period of time when a welding wire feeder is turned on and feeds the welding wire at an initial wire feed rate. The run-in period may end, for example, when there is a first strike of the welding wire to the workpiece. An example run-in period is represented in FIG. 4 run-in as ending when the welding wire feeder starts to ramp up the wire feed rate.

The control circuitry 110 is configured to control the current pulses output by the power conversion circuitry 130 by controlling a pulse period and a pulse duty cycle. Accordingly, each current pulse may have a specific period and duty cycle associated with the current pulse, and the period and/or duty cycle may be different from pulse to pulse. However, several current pulses can have the same period and/or duty cycle. The duty cycle and/or the period for the current pulses may be pre-determined or calculated in real time by, for example, the control circuitry. Calculating in real-time may entail, for example, calculating the pulse duty cycle and/or the pulse period in time to output the current pulse without delay. If pre-determined, the control circuitry 110 can read the pulse information such as the pulse period and pulse duty cycle values from, for example, memory, where the values may be stored in a lookup table. For example, the pulse information for a next pulse can be retrieved from memory, or calculated if the information is not retrieved from memory, prior to the start of the next pulse so that the next pulse can be controlled appropriately.

The pulse period and the pulse duty cycle may be based on, for example, a type of welding wire and a shield gas to be used in the welding process. A pulse period may be considered to be from, for example, a rising edge of a pulse to the rising edge of the next pulse (time period Ta-Tb in FIG. 4), or from the falling edge of a pulse to a falling edge of the next pulse (time period Ty-Tz in FIG. 4). Accordingly, pulse information can be retrieved or generated during a previous pulse period. For example, the pulse information may be provided during a non-active portion of a pulse (for example, time period Ty-Tb in FIG. 4), an active portion of a pulse (for example, time period Ta-Ty in FIG. 4), or at any period during a pulse (for example, time period Ta-Tb in FIG. 4) to allow an active portion of the next pulse (for example, time period Tb-Tz) to be shaped appropriately according to the pulse information comprising the period and the duty cycle. It should be noted that while a pulse is shown as an active period followed by an inactive period, a pulse may also be described as an inactive period followed by an active period. Furthermore, while an example was given of providing pulse information during the previous pulse period, an example of the disclosure may provide the pulse information before the previous pulse period.

In an example of the disclosure, the pulse information, for one or more welding processes that each have a unique welding wire type and welding gas combination, may be downloaded from another electronic device either wirelessly or via a wired connection. The wireless or wired download may be from, for example, another server that generates and/or stores welding information and downloads the appropriate information to the system 100 as needed. Additionally, a wired download may be from a memory device including, for example, the memory 220 or a flash drive that can plug into a USB port. The pulse information may have been downloaded to the memory device by a server, for example. The pulse information may be read for one or more pulses from the memory device.

Figure 2:
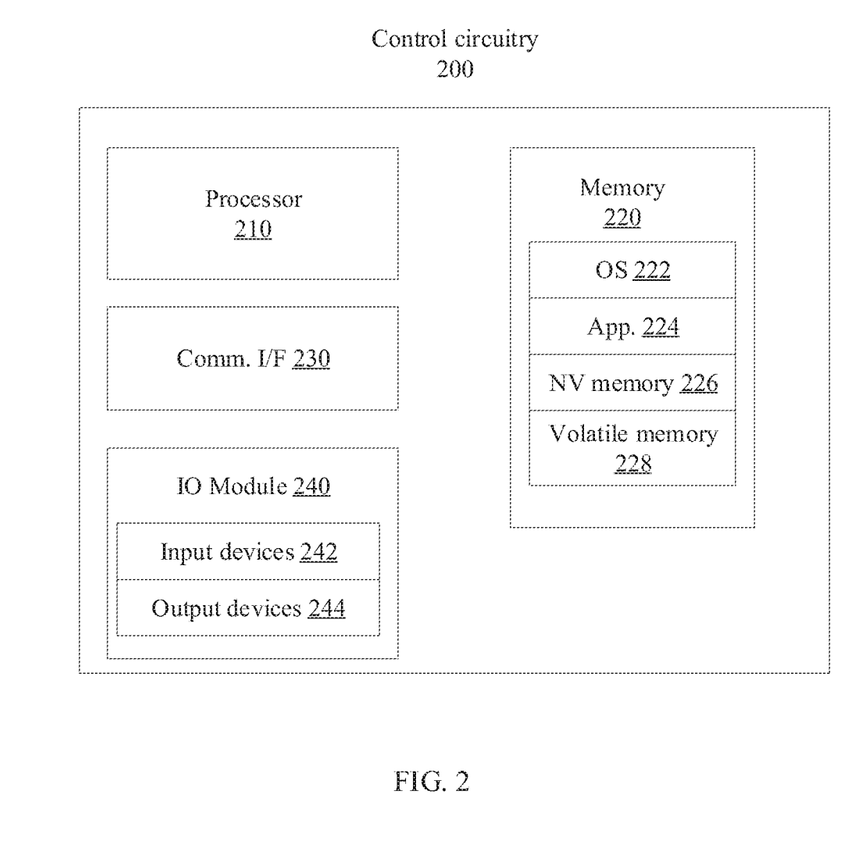
FIG. 2 shows a block diagram of an example control circuitry, in accordance with aspects of the disclosure.

In an example of the disclosure, the pulse information for one or more pulses may be requested via wire or wirelessly using the communication interface 230. The pulse information may be provided by, for example, an electronic device configured to communicate via one or both of wired or wireless communication.

Some examples also provide at least one pulse during the run-in period for a welding process. For example, FIG. 4 shows an active portion of a pulse 402 during the time period T1-T3. While time T3 is shown to coincide substantially with the end of the run-in period P1 (FIG. 4), various examples of the disclosure may have the active portion of a pulse 402 end prior to the end of the run-in period P1, or after the end of the run-in period P1. Also, the start time T1 of the pulse 402 is shown as an example to be after the time T0, however, the start time T1 may be any time at T0 or after T0. It should be noted that time T0 may be the time when power is available to generate the pulses 402, 404, and 406 shown in FIG. 4.

Additionally, while a single pulse 402 has been shown for the sake of brevity, various examples can have multiple pulses 402 during the run-in period P1. Therefore, an active period of the first of the pulses 402 can start at time T0 or after time T0, and an active period of the last of the pulses 402 can end before time T3, at time T3 or after time T3. Accordingly, there may be multiple pulses 402 comprising one or more pulses 402a and one or more pulses 402b. The pulses 402a and 402b may be of constant period and duty cycle, or the period and/or duty cycles may vary.

Similarly as described above, the pulse information for the next pulse may be retrieved or generated prior to the start of a present pulse period. It should also be noted that the pulse information for a pulse may be provided after the active portion of that pulse starts (for example, after time Ta for a first pulse 404) as long as the pulse period and duty cycle for a first of the pulses 404 can be controlled appropriately.

Additionally, once the welding wire is at a steady wire feed speed at time T4, for example, the current pulses may be kept constant with respect to the pulse period and the pulse duty cycle. The steady wire feed speed may be known for a welding process that the system 100 is configured for, or the steady wire feed speed may be a commanded wire feed speed that is entered by a user via, for example, the input devices 242 or received via the communication interface 230 in FIG. 2.

The control circuitry 110 may continue to receive feedback regarding the wire feed speed during the welding process, and determine/retrieve new pulse information based on the wire feed speed. The wire feed speed may be provided by any of several methods such as, for example, a predictive speed filter, monitoring a motor speed of a wire feed motor 140, and/or monitor a travel speed of the welding wire. These methods for feeding back wire feed speed information may be determined by using any appropriate technology presently known or to be developed in the future. For example, the predictive speed filter may be a Kalman filter where the instructions to perform the filtering may be in the memory 220 (FIG. 2).

The feedback information may be provided by, for example, sensors 160 that sense the speed of the wire motion or motor speed, the control circuitry 110 that controls the wire feed motor 140, etc. These sensors 160 may be, for example, in the system 100. Various sensors may also be in the welding torch 170 (sensors in the welding torch 170 are not shown) or in another module (not shown).

Additionally, other examples of the system 100 may have the control circuitry 110 control a current level of the output pulses to add an additional level of control to the system 100.

While an example of the system 100 is shown as having the control circuitry 110, the power source 120, and the power conversion circuitry 130 in separate blocks, another example of the disclosure may have a different grouping of the control circuitry 110, the power source 120, the power conversion circuitry 130. For example, the power source 120 and the power conversion circuitry 130 may be in one block, or the control circuitry 110, the power source 120, and the power conversion circuitry 130 may be in one block. Similarly, the wire feed motor 140, the gas supply 160, and the sensors 170 may be grouped differently than shown in FIG. 1. Accordingly, it can be seen that various examples of the disclosure may configure the system 100 differently depending on the design criteria for the system 100.

Referring to FIG. 2, there is shown an example control circuitry 200 that may be used with various examples of the disclosure, and may be similar to the control circuitry 110 in FIG. 1. The control circuitry 200 may comprise, for example, a processor 210, memory 220, a communication interface 230, and an IO interface 240. The processor 210 may comprise, for example, one or more of processors (CPUs, GPUs, etc.), controllers, system on chips, ASICs, etc.

The memory 220 may include non-volatile memory 226 and volatile memory 228. The storage described for holding local data may be part of the memory 220 or comprise separate memory. The operating system 222, applications 224, and/or data such as a look up table, may be stored in, for example, the non-volatile memory 226, and may be copied to volatile memory 228 for execution/access by the processor 210. Various aspects of the disclosure may use different memory architectures that are design and/or implementation dependent. For example, some aspects of the disclosure may have the operating system 222 and applications 224 in the non-volatile memory 226 executed at least in part from the non-volatile memory 226.

The communication interface 230 may allow the control circuitry 200 to communicate with other devices via, for example, a wired protocol such as USB, Ethernet, Firewire, etc., or a wireless protocol such as Bluetooth, Near Field Communication (NFC), Wi-Fi, etc. The wired or wireless protocol may also be, for example, a proprietary protocol. The various types of radios for communication may be referred to as a transceiver for the sake of simplicity. The communication may be, for example, with various sensors and/or devices that can relay sensor data. The communication interface 230 may also be used to communicate with other networks such as local networks, cellular networks, etc. The IO module 240 may allow various devices to plug into, for example, a USB port. For example, a keyboard and/or a mouse may plug into their respective USB ports, or communicate wirelessly to a USB dongle that allows wireless communication with, for example, a wireless keyboard and/or mouse. A USB port may also be used to download and/or upload data from/to a memory device such as, for example, FLASH drive.

The control circuitry 200 may also comprise the IO module 240 for communication with a user via the input devices 242 and output information to be displayed on output devices 244. The input devices 242 may comprise, for example, switches, slide switches, membrane switches, buttons, touch sensitive screen, which may be a part of a display, a microphone, etc. The touch sensitive screen (touchscreen) may have soft buttons, switches, slide switches, keyboard, etc. that emulate their physical counterparts. The input devices 242 may also comprise, for example, a keyboard, a mouse, a trackball, etc., as well as various sensors, cameras, etc. The input devices 242 may additionally comprise, for example, bar code readers and/or other type of scanners that may be used to identify an object. The output devices 244 may comprise, for example, display(s), speaker(s), LED(s), vibration motor(s), etc. Some devices such as a touchscreen are able to provide both input and output functions of the IO module 240.

The processor 210 may operate using different architectures in different examples of the disclosure. For example, the processor 210 may use the memory 220 to store instructions to execute, or the processor 210 may have its own memory (not shown) for its instructions.

Various examples may use other architectures where the different functionalities may be grouped differently. For example, the functionalities may be in different integrated circuit chips, or different devices may be combined. In a non-limiting example, the IO module 240 and the communication interface 230 may be combined together. Additionally, the control circuitry 200 may refer logically to various physical devices. For example, one or more of the output devices 244 may be part of a different integrated circuit or on a different printed circuit board than one or more of the input devices 242.

Figure 3:
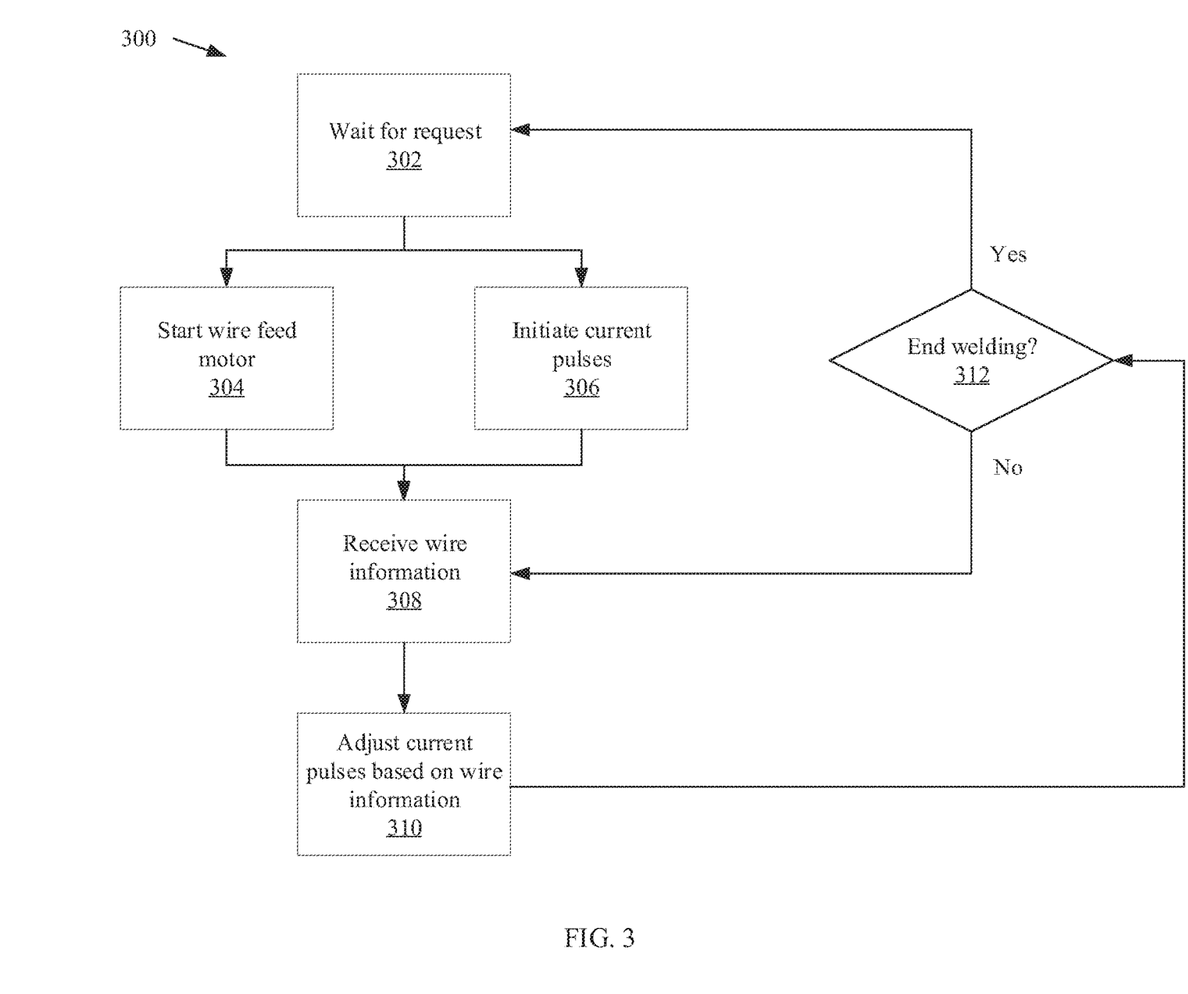
FIG. 3 shows a flow diagram representative of example machine readable instructions 300, which may be executed by the example control circuitry 110 and/or 200 of FIGS. 1 and 2 to implement the arc start pulse control phase for pulse arc starting phase for the system 100 of FIG. 1.

FIG. 3 shows a flow diagram representative of example machine readable instructions 300, which may be executed by the example control circuitry 110, 200 of FIGS. 1 and/or 2 to implement the arc start pulse control phase for pulse arc starting phase for the system 100 of FIG. 1. For example, the instructions 300, which may be in an application 224, may be executed by the processor 210 to control the system 100 to output current pulses for an arc starting phase for welding.

In block 302, the system 100 may wait for a start request for a welding procedure. The start request may be received via, for example, the input devices 242 of FIG. 2 and/or the start request may occur when the system 100 is turned on. In block 304, a controller such as, for example, the control circuitry 110 or 200 may start the wire feed motor 140. The wire feed motor 140 may then proceed to feed the wire at a run-in speed as shown in FIG. 4. In block 306, the current pulses are initiated to start an arc with the welding torch 170 for the welding process. Each current pulse is controlled for its period and its duty cycle to appropriately heat the welding wire without causing it to break or sputter.

In block 308, wire feed speed information is received from, for example, a predictive speed filter such as a Kalman filter, or from a feedback mechanism that reports the wire feed speed or information that can be processed to determine the wire feed speed. In some cases, the commanded wire feed speed may be used rather than the wire feed speed information.

In block 310, the wire feed speed is used to control at least the next current pulse, depending on the feedback rate and processing of the wire feed speed information. In block 312, it may be determined whether the welding process is finished. For example, when the welding torch trigger is released, the welding process may be assumed to be finished for the time being and the wire feed motor 140 may be turned off. The instructions 300 may then proceed to block 302 to wait for a start request.

While an example flow diagram is shown in FIG. 3 for illustrative purposes, it should be understood that various other flow diagrams may also describe other examples of the disclosure. For example, in another example of the disclosure, the blocks 304 and 306 may be performed in series rather than in parallel as shown in FIG. 3.

FIG. 4 shows graphs that illustrate example pulse control signals output by the control circuitry 110 and/or 200 of FIGS. 1 and 2 and example wire feed speed for the system 100 in FIG. 1. Graph 400 shows a graph of $I_{CMD}$ versus time, where $I_{CMD}$ is a control signal from the control circuitry 110 used by the power conversion circuitry 130 to output current pulses for use in welding. Graph 410 shows a graph of wire feed speed in inches/min (IPM) versus time.

In the example shown, graph 400 shows a single active pulse 402 (time period T1-T3) during the run-in period P1 (time period T0-T3), and a plurality of pulses 404 and 406 after the run-in period P1. However, it should be understood that the control signal $I_{CMD}$ can start (be active) at any time prior to the run-in period P1, as well as during the run-in period P1. That is, while FIG. 4 discloses an example of the control signal $I_{CMD}$ during the time period T1-T3 (pulse 402), other examples may have the control signal $I_{CMD}$ start at time T0 or any time after time T0. The run-in period P1 and the ramp period P3 (time period T3-T4) are shown in the graph 410. The period after T4 in graph 410 is the period when the wire feed speed has reached a desired speed for the welding process.

Furthermore, while a single pulse 402 is shown as an example pulse that starts after time T0 during the run-in period P1 in FIG. 4, other aspects of the disclosure may have a single pulse 402 that starts at time T0. Still other aspects of the disclosure may have two or more pulses 402 during the run-in period P1, where the first pulse starts at either time T0 or after time T0. Furthermore, there may be multiple pulses during the run-in period P1 that may comprise a pulse 402a and one or more pulses 402b, where the various pulses may have similar or different active and inactive times. Accordingly, each pulse may be controlled as to its active and inactive times.

Similarly, while three pulses 404 are shown as an example during the ramp period P3, various aspects of the disclosure need not be so limited. Accordingly, there may be a different number of pulses 404 in a different aspect of the disclosure. The pulses 404 are also shown to have different active and inactive times, however, various aspects of the disclosure need not be so limited. Accordingly, two or more pulses 404 may have similar active and/or inactive times. Accordingly, in an aspect of the disclosure, the pulses 404 may be fixed rather than controlled in coordination with the wire feed speed.

Similarly, while the pulses 406 are shown to have similar active and inactive times, various aspects of the disclosure need not be so limited. Accordingly, one or more of the pulses 406 may be controlled to have different active and/or inactive times as well as different pulse periods.

Additionally, various aspects of the disclosure may provide for an "initiate period P2" that can occur, for example, during a portion of the pulse 402. The initiate period P2 may be at the beginning of the pulse 402 during the time period T1-T2 as shown, or the initiate period P2 may start after the beginning of the pulse 402. During the initiate period P2, there may be provided, for example, constant voltage, constant current, constant energy, pulsed voltage, pulsed current, and/or pulsed energy.

It should be noted that while multiple pulses 402b are provided after the initiate period P2 (time period T1-T2), various examples of the disclosure need not be so limited. For example, the pulses 402b may start before time T2 or after time T2.

Accordingly, it can be seen that the present disclosure provides for a system for providing pulsed arc starting phase, comprising power conversion circuitry configured to convert input power to welding-type power, and to output the welding-type power. The system also comprises control circuitry configured to control the power conversion circuitry to output the welding-type power by controlling the power conversion circuitry to output a plurality of welding current pulses during at least a portion of one or both of a run-in period or a ramp period for wire feeding of a welding wire, where each of the plurality of welding current pulses is associated with a respective pulse period and a respective pulse duty cycle.

One or more of the respective pulse period and the respective pulse duty cycle may be based on, for example, a welding wire type and a shield gas. The control circuitry may be configured to perform one or both of retrieve a pre-determined pulse period and a pre-determined pulse duty cycle from memory, or determine the respective pulse period and the respective pulse duty cycle in real time. The pre-determined pulse period and the pre-determined pulse duty cycle for a subsequent welding current pulse can be retrieved by the control circuitry during, for example, the pulse period of a present welding current pulse. The respective pre-determined pulse period and the respective pre-determined pulse duty cycle can also be received from an external electronic device via one or both of wireless communication and wired communication, and the received pre-determined pulse period and the received respective pre-determined pulse duty cycle can be stored in memory.

The control circuitry is configured to provide one or more pulses during at least a portion of the run-in period, where at least one of the one or more pulses comprises one or more of constant voltage, constant current, or constant energy.

The control circuitry is also configured to provide at least one first welding current pulse during the run-in period, and end a last of the at least one first welding current pulse substantially when the run-in period ends.

The output of the plurality of welding current pulses may be correlated to a wire feed speed, where the wire feed speed can be provided by a predictive speed filter, such as, for example, a Kalman filter. The wire feed speed may also be provided by, for example, a commanded wire feed speed. The control circuitry may also be configured to determine the wire feed speed of the welding wire by monitoring a motor speed of a wire feed motor and/or a travel speed of the welding wire.

The disclosure can also be seen to provide for a method for providing pulsed arc starting phase, comprising converting, during at least a portion of one or both of a run-in period or a ramp period for feeding a welding wire, an input welding current to output a plurality of welding current pulses, where each of the plurality of welding current pulses is associated with a respective pulse period and a respective pulse duty cycle. The respective pulse period and the respective pulse duty cycle may be based on, for example, a welding wire type and a shield gas. The method may also comprise one of determining the respective pulse period and the respective pulse duty cycle in real time or retrieving pre-determined pulse periods and pre-determined pulse duty cycles from memory.

The pre-determined pulse period and the pre-determined pulse duty cycle for a subsequent welding current pulse may be retrieved, for example, during the pulse period of a present welding current pulse.

The method may further comprise receiving the pre-determined pulse periods and the pre-determined pulse duty cycles from an external electronic device via one or both of wireless communication and wired communication, and storing the received pre-determined pulse periods and the pre-determined pulse duty cycles in the memory.

The output of the plurality of welding current pulses may be correlated to a wire feed speed provided by using one of a predictive speed filter, commanded wire feed speed, and a speed determined by monitoring one or both of a motor speed of a wire feed motor and a travel speed of the welding wire. The predictive speed filter may comprise, for example, a Kalman filter.

The method may also provide for providing one or more pulses during at least a portion of the run-in period, where at least one of the one or more pulses comprises one or more of constant voltage, constant current, or constant energy.

The present disclosure may also provide for a system for providing pulsed arc starting phase, comprising power conversion circuitry configured to convert input power to welding-type power. The power conversion circuitry may also be configured to output the welding-type power. The system may comprise control circuitry configured to control the power conversion circuitry to output the welding-type power by controlling the power conversion circuitry to output at least one first welding current pulse during a run-in period for wire feeding of a welding wire, including respective first pulse periods and respective first pulse duty cycles of the at least one first welding current pulse, and controlling the power conversion circuitry to output a plurality of second welding current pulses after the run-in period, including respective second pulse periods and respective second pulse duty cycles of the plurality of second welding current pulses, wherein the output of the welding-type power is correlated to a wire feed speed.

The control circuitry may also be configured to provide one or more pulses during at least a portion of the run-in period, where at least one of the one or more pulses comprises one or more of constant voltage, constant current, or constant energy.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electrical and/or electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or." As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y and z." As utilized herein, "one of x or y" or "one of x and y" is equivalent to any element of the set {(x), (y)}.

As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain examples and/or aspects, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular examples disclosed. Instead, the present method and/or system will include all implementations falling within the scope of the appended claims, both literally and under the doctrine of equivalents.

What are claimed:

1. A system for providing a pulsed arc starting phase of a welding process, the system comprising:
   power conversion circuitry configured to convert input power to welding-type power, and to output the welding-type power; and
   control circuitry configured to control the power conversion circuitry to output the welding-type power by:
   controlling the power conversion circuitry to output a plurality of welding current pulses during at least a portion of one or both of a run-in period or a ramp period for wire feeding of a welding wire,
   wherein each of the plurality of welding current pulses is associated with a respective pulse period and a respective pulse duty cycle,
   wherein the power conversion circuitry is configured to correlate the output of the plurality of welding current pulses to a wire feed speed and to receive feedback regarding the wire feed speed during the welding process to determine new pulse information,
   wherein the new pulse information is generated from a first pulse of the plurality of welding current pulses and used to correlate a second pulse of the plurality of welding current pulses to the wire feed speed, and
   wherein the second pulse immediately follows the first pulse.

2. The system of claim 1, wherein one or more of the respective pulse period and the respective pulse duty cycle are based on a welding wire type and a shield gas.

3. The system of claim 1, wherein the control circuitry is configured to perform one or both of:
   retrieve a pre-determined pulse period and a pre-determined pulse duty cycle from memory, or
   determine the respective pulse period and the respective pulse duty cycle in real time.

4. The system of claim 3, wherein the control circuitry is configured to retrieve the pre-determined pulse period and the pre-determined pulse duty cycle for a subsequent welding current pulse during the pulse period of a present welding current pulse.

5. The system of claim 3, wherein the respective pre-determined pulse period and the respective pre-determined pulse duty cycle are received via one or both of wireless communication and wired communication, and stored in the memory.

6. The system of claim 1, wherein the control circuitry is configured to provide one or more pulses during at least a portion of the run-in period, wherein at least one of the one or more pulses comprises one or more of constant voltage, constant current, or constant energy.

7. The system of claim 1, wherein the control circuitry is configured to:
provide at least one first welding current pulse during the run-in period, and end a last of the at least one first welding current pulse when the run-in period ends.

8. The system of claim 1, wherein the output of the plurality of welding current pulses is correlated to the wire feed speed.

9. The system of claim 8, wherein the wire feed speed is provided by one or more of:
a predictive speed filter;
a commanded wire feed speed, or
a determined wire feed speed of the welding wire determined by the control circuitry by monitoring one or both of a motor speed of a wire feed motor and a travel speed of the welding wire.

10. The system of claim 8, wherein the wire feed speed is provided by a Kalman filter.

11. A system for providing a pulsed arc starting phase, the system comprising:
power conversion circuitry configured to convert input power to welding-type power, and to output the welding-type power; and
control circuitry configured to control the power conversion circuitry to output the welding-type power by controlling the power conversion circuitry to output:
at least one welding current pulse during a run-in period for wire feeding of a welding wire; and
a plurality of welding current pulses during a ramp period for wire feeding of the welding wire,
wherein a duty cycle of the plurality of welding current pulses increases as a feed speed of the welding wire increases during the ramp period.

12. The system of claim 11, wherein each of the plurality of welding current pulses is associated with a respective pulse period and a respective pulse duty cycle.

13. The system of claim 12, wherein one or more of the respective pulse period and the respective pulse duty cycle are based on a welding wire type and a shield gas.

14. The system of claim 12, wherein the control circuitry is configured to perform one or both of:
retrieve a pre-determined pulse period and a pre-determined pulse duty cycle from memory, or
determine the respective pulse period and the respective pulse duty cycle in real time.

15. The system of claim 14, wherein the control circuitry is configured to retrieve the pre-determined pulse period and the pre-determined pulse duty cycle for a subsequent welding current pulse during the pulse period of a present welding current pulse.

16. The system of claim 14, wherein the respective pre-determined pulse period and the respective pre-determined pulse duty cycle are received via one or both of wireless communication and wired communication, and stored in the memory.

17. The system of claim 11, wherein the at least one welding current pulse during the run-in period comprises one or more of constant voltage, constant current, or constant energy.

18. The system of claim 11, wherein the control circuitry is further configured to control the power conversion circuitry to output the welding-type power by controlling the power conversion circuitry to output a second plurality of welding current pulses after completion of the ramp period, wherein a duty cycle of the second plurality of welding current pulses is constant.

19. A system for providing a pulsed arc starting phase, the system comprising:
power conversion circuitry configured to convert input power to welding-type power, and to output the welding-type power; and
control circuitry configured to control the power conversion circuitry to output the welding-type power by controlling the power conversion circuitry to output:
at least one welding current pulse during a run-in period for wire feeding of a welding wire;
a first plurality of welding current pulses during a ramp period for wire feeding of the welding wire; and
a second plurality of welding current pulses after completion of the ramp period,
wherein a duty cycle of the first plurality of welding current pulses increases as a feed speed of the welding wire increases during the ramp period, and
wherein a duty cycle of the second plurality of welding current pulses is constant.

20. The system of claim 19, wherein the duty cycle of the second plurality of welding current pulses is greater than or equal to the duty cycle of the first plurality of welding current pulses upon completion of the ramp period.

* * * * *